(12) United States Patent
Mielke et al.

(10) Patent No.: US 10,746,034 B2
(45) Date of Patent: Aug. 18, 2020

(54) AIRFOIL FOR A TURBO MACHINE

(71) Applicant: General Electric Company, Schenectady, NY (US)

(72) Inventors: Mark Joseph Mielke, Blanchester, OH (US); Heidi Stegemiller, Franklin, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/007,289

(22) Filed: Jun. 13, 2018

(65) Prior Publication Data

US 2019/0383154 A1    Dec. 19, 2019

(51) Int. Cl.
*F01D 9/04*    (2006.01)

(52) U.S. Cl.
CPC ........ *F01D 9/042* (2013.01); *F05D 2220/321* (2013.01); *F05D 2240/12* (2013.01); *F05D 2240/91* (2013.01); *F05D 2260/00* (2013.01); *F05D 2300/43* (2013.01)

(58) Field of Classification Search
CPC ... F01D 1/02; F01D 1/18; F01D 5/022; F01D 5/06; F01D 5/28; F01D 5/282; F01D 9/00; F01D 9/02; F01D 9/041; F01D 9/042; F01D 17/00; F01D 17/10; F01D 17/12; F01D 17/14; F01D 17/16; F01D 17/162; F04D 27/002; F04D 27/0246; F05D 2220/321; F05D 2220/3212; F05D 2220/3213; F05D 2220/3215; F05D 2220/3216; F05D 2220/3217; F05D 2220/3218; F05D 2220/3219; F05D 2240/10; F05D 2240/12; F05D 2240/14; F05D 2240/91; F05D 2250/411
See application file for complete search history.

(56) References Cited

U.S. PATENT DOCUMENTS

| | | | |
|---|---|---|---|
| 6,283,705 B1 * | 9/2001 | Rice | F01D 17/162 415/160 |
| 7,963,742 B2 | 6/2011 | Clouse et al. | |
| 8,556,589 B2 | 10/2013 | Davis et al. | |
| 9,376,916 B2 | 6/2016 | McCaffrey et al. | |
| 9,784,285 B2 | 10/2017 | Reynolds et al. | |
| 2010/0232936 A1 * | 9/2010 | Mielke | F01D 17/162 415/160 |
| 2016/0076548 A1 | 3/2016 | Reynolds et al. | |
| 2016/0169246 A1 * | 6/2016 | Jan | F01D 17/162 415/151 |
| 2016/0333733 A1 * | 11/2016 | Robertson, Jr. | B29C 70/68 |
| 2017/0217061 A1 | 8/2017 | Roche et al. | |
| 2017/0232662 A1 | 8/2017 | Bailly et al. | |
| 2017/0282466 A1 | 10/2017 | Backhouse | |
| 2018/0057694 A1 | 3/2018 | Tsotsis | |

* cited by examiner

*Primary Examiner* — Nathaniel E Wiehe
*Assistant Examiner* — Eric A Lange
(74) *Attorney, Agent, or Firm* — Hanley, Flight & Zimmerman, LLC

(57) ABSTRACT

An airfoil assembly for a turbo machine, the airfoil assembly including an airfoil defining a leading edge and a trailing edge, and further defining ends separated along a span of the airfoil; a shaft extended from the end of the airfoil; and a button surrounding at least a portion of the end of the airfoil, the button comprising a composite material.

18 Claims, 4 Drawing Sheets

AIRFOIL FOR A TURBO MACHINE

FEDERALLY SPONSORED RESEARCH

This invention was made with government support under contract number FA8650-09-D-2922 of the U.S. Government. The government may have certain rights in the invention.

FIELD

The present subject matter relates generally to airfoils for turbo machines.

BACKGROUND

Turbo machines, such as steam and gas turbine engines, include airfoils or vanes configured to adjust a pressure or flow of air through the turbo machine, such as to control or improve operability and performance of the turbo machine. As turbo machines are in constant need of improved performance and operability, there is a need for airfoil assemblies that may improve turbo machine performance and operability.

BRIEF DESCRIPTION

Aspects and advantages of the invention will be set forth in part in the following description, or may be obvious from the description, or may be learned through practice of the invention.

The present disclosure is directed to a turbo machine including an airfoil assembly. The airfoil assembly includes an airfoil defining a leading edge and a trailing edge, and further defining ends separated along a span of the airfoil; a shaft extended from the end of the airfoil; and a button surrounding at least a portion of the end of the airfoil, the button including a composite material.

In various embodiments, the button includes a polymer matrix composite (PMC) material. In one embodiment, the button includes a PMC material including one or more styrenes, vinyls, cellulosics, polyesters, acrylics, polysulphones, imides, or combinations thereof, or one or more polyolefins, polyamides, fluoropolymer, ethyl-methyl acrylate, polyesters, polycarbonates, acetals, or combinations thereof, or one or more polyesters, polyurethanes, esters, epoxies, or combinations thereof.

In one embodiment, the button is extended along a chord of the airfoil from the leading edge to the trailing edge.

In another embodiment, the button is defined along 10% or less of the span of the airfoil.

In still another embodiment, the airfoil includes a composite material.

In yet another embodiment, the shaft includes a metal-based material.

In still yet another embodiment, the shaft, the button, and the airfoil are formed integrally together.

In still yet various embodiments, the turbo machine includes a casing defining a recess into which the button of the airfoil assembly is disposed. In one embodiment, the airfoil assembly and the casing together define, at least in part, a compressor section of the turbo machine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
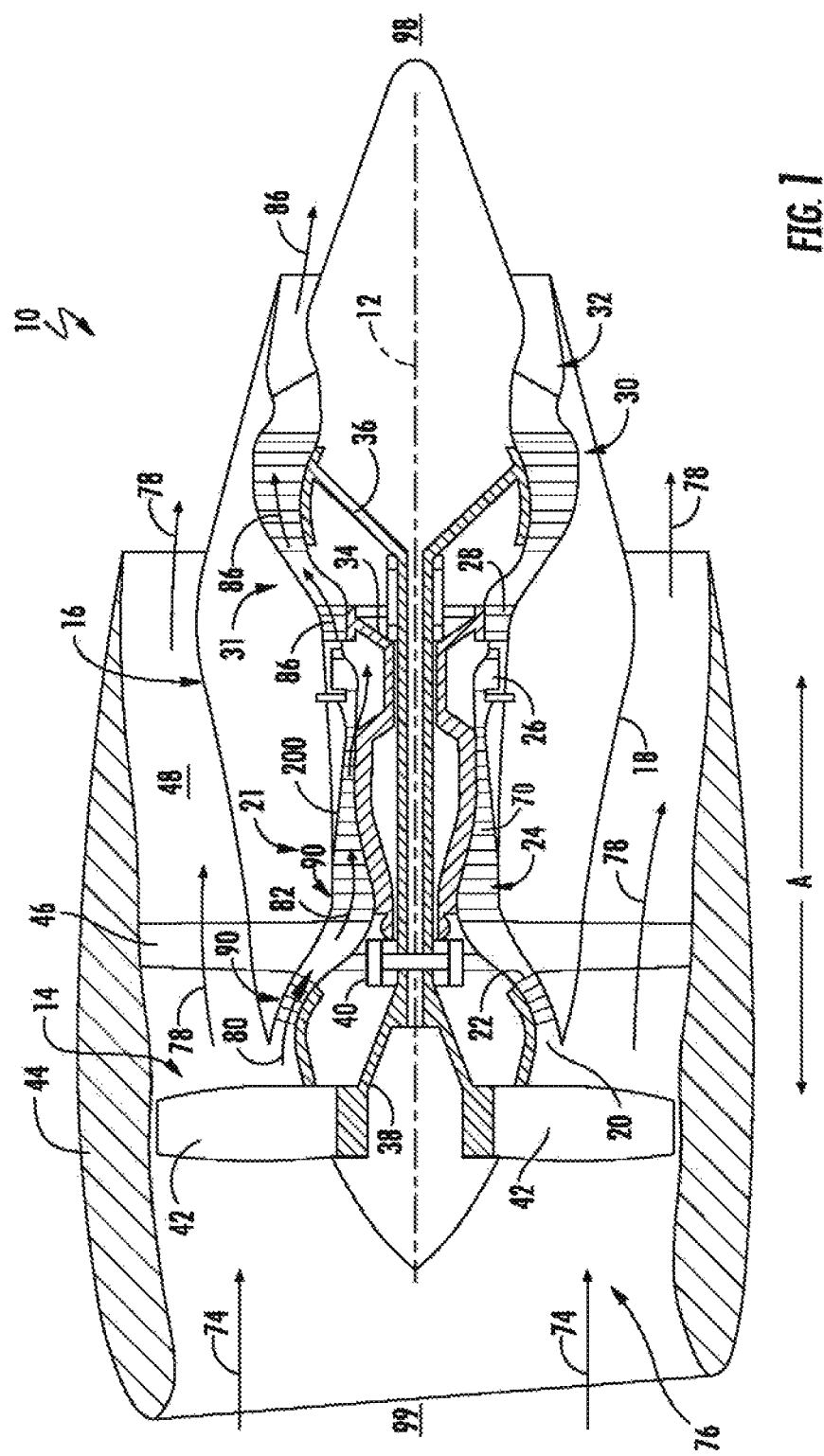
FIG. 1 is a schematic cross sectional view of an exemplary embodiment of a turbo machine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of an airfoil assembly are generally provided herein that may improve turbo machine performance via reducing weight relative to known airfoil assemblies. The reduced weight thereby improves a ratio of engine thrust output versus weight, further improving fuel consumption of the engine and an apparatus to which the engine is attached (e.g., an aircraft, a ground-based vehicle, a sea-based vehicle, etc.).

Referring now to the drawings, FIG. 1 is a schematic partially cross-sectioned side view of an exemplary turbo machine 10 herein referred to as "engine 10" as may incorporate various embodiments of the present invention. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14.

The core engine 16 may generally include a substantially tubular outer casing 18 that defines a core inlet 20 to a core flowpath 70. The outer casing 18 encases or at least partially forms the core engine 16. The outer casing 18 further includes a flowpath casing 200 defining the core flowpath 70. The outer casing 18 encases or at least partially forms, in serial flow relationship, a compressor section 21 having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

It should be appreciated that combinations of the shaft 34, 36, the compressors 22, 24, and the turbines 28, 30 define a rotor assembly of the engine 10. For example, the HP shaft 34, HP compressor 24, and HP turbine 28 may define an HP rotor assembly of the engine 10. Similarly, combinations of the LP shaft 36, LP compressor 22, and LP turbine 30 may define an LP rotor assembly of the engine 10. Various embodiments of the engine 10 may further include the fan shaft 38 and fan blades 42 as the LP rotor assembly. In other embodiments, the engine 10 may further define a fan rotor assembly at least partially mechanically de-coupled from the LP spool via the fan shaft 38 and the reduction gear 40. Still further embodiments may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrows 80, enters the flowpath 70 at the core engine 16 through the core inlet 20 defined at least partially via the casing 200. The flow of air 80 is increasingly compressed as it flows across successive stages of the compressors 22, 24, such as shown schematically by arrows 82. The compressed air 82 enters the combustion section 26 and mixes with a liquid or gaseous fuel and is ignited to produce combustion gases 86. The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the bypass airflow passage 48, such as shown schematically by arrows 78.

Figure 2:
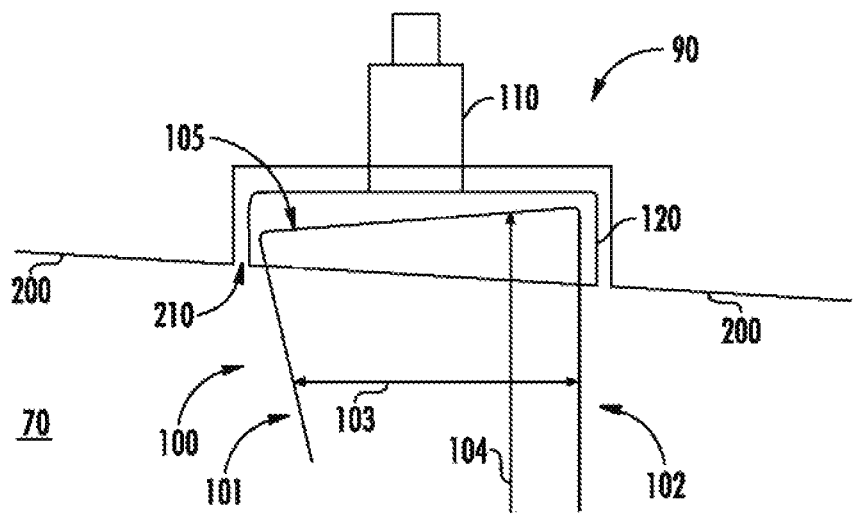
FIGS. 2-3 are exemplary side views of exemplary embodiments of an airfoil assembly according to aspects of the present disclosure.
Figure 3:
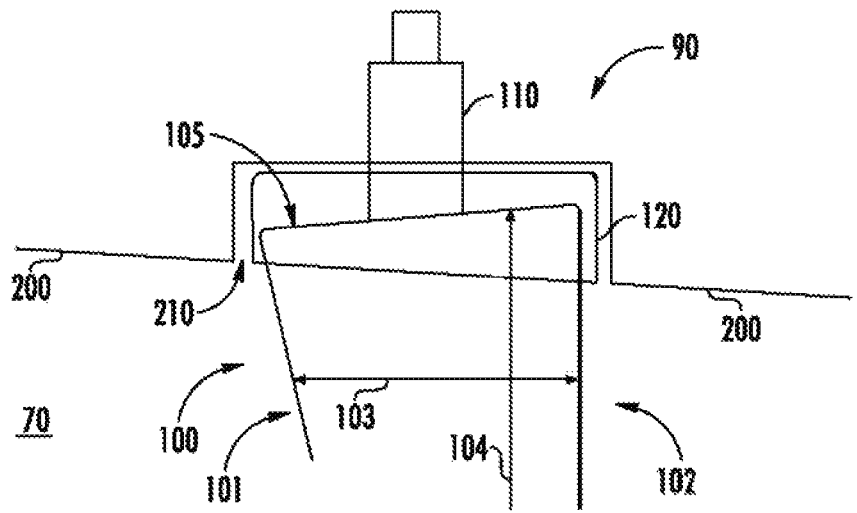
Figure 4:
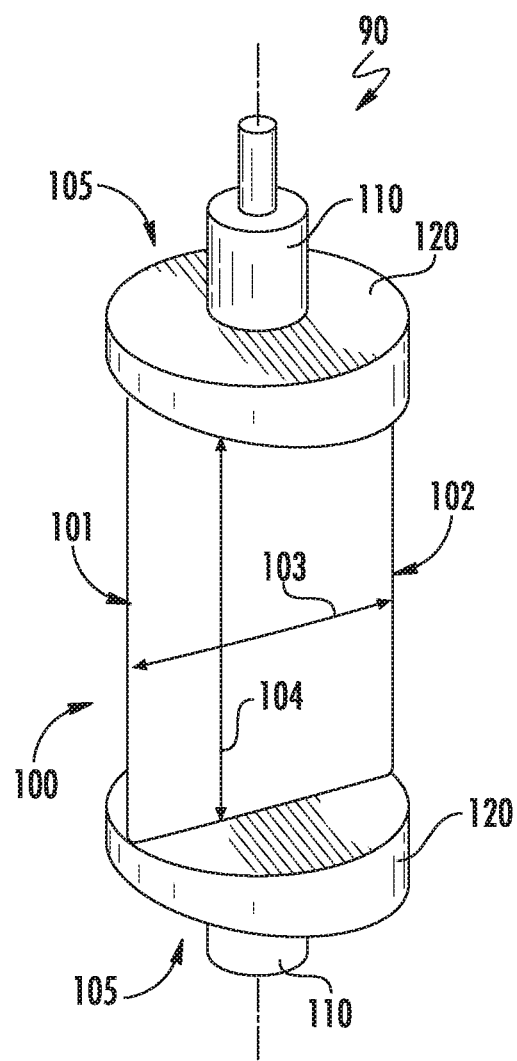
FIG. 4 is an exemplary perspective view of an exemplary embodiment of the airfoil assembly.

Referring now to FIGS. 2-3, side views of exemplary embodiments of an airfoil assembly 90 within the engine 10 (FIG. 1) are generally provided. Referring also to FIG. 4, a perspective view of an exemplary embodiment of the airfoil assembly 90 is generally provided. Referring to FIGS. 2-4, the airfoil assembly 90 includes an airfoil 100 defining a leading edge 101 and a trailing edge 102 separated along a chord 103 of the airfoil 100. The airfoil 100 further defines ends 105 separated along a span 104 of the airfoil 100.

The airfoil assembly 90 includes a shaft 110 extended from the end 105 of the airfoil 100. The airfoil assembly 90 further includes a button 120 surrounding at least a portion of the end 105 of the airfoil 100.

In one embodiment, the button 120 is substantially cylindrical, such as extended at least partially along the span 104 of the airfoil 100 and surrounding the end 105 of the airfoil 100. In other embodiments, the button 120 defines a conical or frusto-conical volume, or wedge volume, or other polygonal volume.

In various embodiments, the button 120 is defined along 10% or less of the span 104 of the airfoil 100 from the end 105. In one embodiment, the button 120 is defined along 7% or less of the span 104 of the airfoil 100 from the end 105. In another embodiment, the button 120 is defined along 5% or less of the span 104 of the airfoil 100 from the end 105. In still various embodiments, the button 120 is defined along at least 1% of the span 104 of the airfoil 100 from the end 105. In other embodiments, the button 120 is defined along at least 3% of the span 104 of the airfoil 100 from the end 105.

In various embodiments, the button 120 is extended along the chord 103 of the airfoil 100 from the leading edge 101 to the trailing edge 102. In one embodiment, such as shown in regard to FIG. 2, the button 120 is extended along 100% of the chord 103 of the airfoil 100 from the leading edge 101 to the trailing edge 102.

In another embodiment, such as shown in regard to FIG. 3, the button 120 is extended partially along the chord 103 of the airfoil 100. In various embodiments, the button 120 may extend 95% or less of the chord 103 of the airfoil 100. In another embodiment, the button 120 may extend 85% or less of the chord 103 of the airfoil 100. In still another embodiment, the button 120 may extend 75% or less of the chord 103 of the airfoil 100. In still yet another embodiment, the button 120 may extend 65% or less of the chord 103 of the airfoil 100.

In still various embodiments, the button 120 is extended along the chord 103 of the airfoil 100 from at least 15% of the chord 103 of the airfoil 100. In one embodiment, the button 120 is extended along the chord 103 of the airfoil 100 from at least 25% of the chord 103 of the airfoil 100. In another embodiment, the button 120 is extended along the chord 103 of the airfoil 100 from at least 45% of the chord 103 of the airfoil 100.

In still yet various embodiments, the button 120 may be extended along the chord 103 of the airfoil 100 from the trailing edge 102 to the leading edge 101, such as in one or more embodiments described above.

Referring briefly to FIG. 3, in one embodiment, the button 120 further surrounds at least a portion of the shaft 110. Referring back to FIGS. 2-3, the airfoil assembly 90 is disposed at least partially within a recess 210 defined within the casing 200 surrounding the airfoil assembly 90. In various embodiments, the button 120 is disposed within the recess 210 of the casing 200. For example, the button 120 may be generally touching, resting upon, secured, or otherwise placed upon the casing 200 within the recess 210. The recess 210 may generally define a volume substantially corresponding to the volume of the button 120 (e.g., a cylindrical volume, a conical or frusto-conical volume, a polygonal volume, etc.). As another example, the button 120 may be substantially disposed within the recess 210 in the casing 200 such as to substantially obscure the button 120 from the flowpath 70 of the engine 10.

Figure 5A:
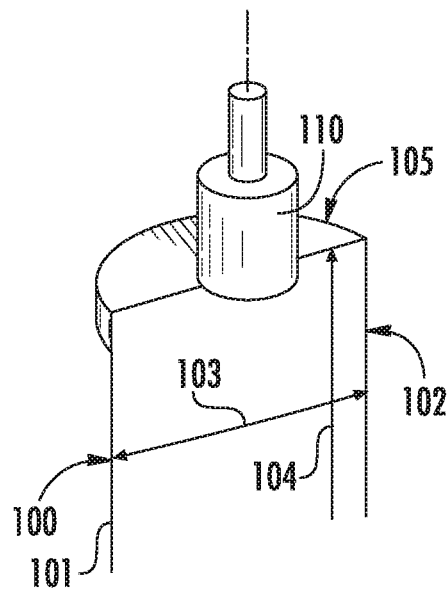
FIGS. 5A-5B are partial perspective views of exemplary embodiments of the airfoil assembly.
Figure 5B:
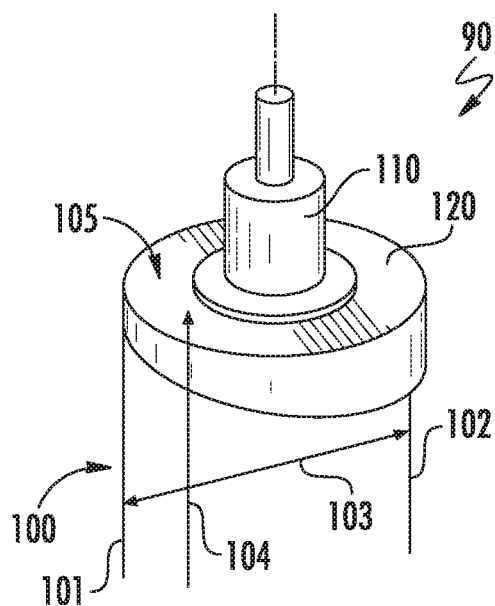

Referring now to FIG. 5A, a partial perspective view of the airfoil 100 and shaft 110 is generally shown within the button 120 for clarity. As generally depicted in regard to the partial perspective view of the airfoil assembly 90 shown in FIG. 5B, the airfoil 100 and shaft 110 generally depicted in FIG. 5A further includes the button 120 surrounding the end 105 of the airfoil 100 from the leading edge 101 to the trailing edge 102. As generally depicted in regard to FIG. 3, the button 120 may further surround at least a portion of the shaft 110.

Referring to the various embodiments generally shown and described in regard to FIGS. 2-4 and FIGS. 5A-5B, the airfoil assembly 90 includes a composite material. In one embodiment, the airfoil 100, the shaft 110, or both, defines a metal-based material. The airfoil 100 and/or shaft 110 defining the metal-based material may include, but is not limited to, nickel-based materials, titanium-based materials, iron- or -steel-based materials, aluminum-based materials, or combinations thereof. In another embodiment, the airfoil 100 defines a composite material. The airfoil 100 and/or shaft 110 defining the composite material may include, but is not limited to, a metal matrix composite (MMC), a ceramic matrix composite (CMC), or a polymer matrix composite (PMC).

In various embodiments, the button 120 defines a composite material. More specifically, the button 120 includes a PMC material. In one embodiment, the button 120 defining the PMC material may include one or more thermoplastic materials. For example, the button 120 defining a PMC thermoplastic material may include one or more PMC materials defining amorphous thermoplastic materials. The button 120 defining a PMC amorphous thermoplastic material may include one or more styrenes, vinyls, cellulosics, polyesters, acrylics, polysulphones, imides, or combinations thereof. More specifically, the button 120 defining the PMC material may include PMC amorphous thermoplastic materials including polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material, or combinations thereof.

In still various embodiments, the button 120 defining the PMC thermoplastic material may include one or more PMC materials defining semi-crystalline thermoplastic materials. The button 120 defining a PMC semi-crystalline thermoplastic material may include one or more polyolefins, polyamides, fluoropolymer, ethyl-methyl acrylate, polyesters, polycarbonates, acetals, or combinations thereof. More specifically, the button 120 defining the PMC material may include PMC semi-crystalline thermoplastic materials including polybutylene terephthalate (PBT), polyethylene terephthalate (PET), polypropylene, polyphenyl sulfide, polyethylene, polyamide (nylon), polyetherketone, or any other suitable semi-crystalline thermoplastic material, or combinations thereof.

In still various embodiments, the button 120 defining the PMC material may include one or more thermoset materials. For example, the button 120 defining the PMC thermoset material may include one or more polyesters, polyurethanes, esters, epoxies, or any other suitable thermoset material, or combinations thereof.

The airfoil assembly 90 may be formed via one or more manufacturing processes. In various embodiments, the airfoil 100 and the shaft 110 may be formed integrally via a casting, forging, and/or machining process, an additive manufacturing or 3D printing process, or combinations thereof. In other embodiments, the airfoil 100 and the shaft 110 may be formed separately and joined via a joining process, including, but not limited to, welding, brazing, adhesive or friction bonding, mechanical fasteners (e.g., nuts, bolts, screws, tie rods, etc.), or combinations thereof.

In one embodiment, the button 120 may be formed via a molding and layup process, or other suitable processes for forming the button 120 defining the composite material. In still various embodiments, the airfoil assembly 100 may integrally form the airfoil 100, the shaft 110, and the button 120 integrally, such as via a casting process, a forging process, an additive manufacturing process, and/or a machining process, such as described above.

In still another embodiment, the button 120 may be fitted (e.g., press fit, interference fit, etc.) onto the airfoil 100, shaft 110, or both. The airfoil assembly 90 may include a separable or separately adjoined button 120 adhered to the airfoil 100, shaft 110, or both. The airfoil 100, shaft 110, or both may further define grooves, ribs, threads, notches, or varying radii such as to screw, press, fit, or otherwise adhere the button 120 to the shaft 110, the airfoil 100, or both. The button 120 may further define grooves, ribs, threads, notches, or varying radii such as to adhere the button 120 to the shaft 110, the airfoil 100, or both. The button 120 may still further define grooves, ribs, threads, notches, or varying radii complimentary to structures at the airfoil 100 (e.g., the end 105 of the airfoil 100), the shaft 110, or both, such as to adhere the button 120 thereto. In various embodiments such as described herein, the button 120 may be adhered to the end 105 of the airfoil 100 and/or the shaft 110, such as described above.

Various embodiments of the airfoil assembly 90 shown and described herein may be defined as a portion of the fan section 14, the compressor section 21, or the turbine section 31 of the engine 10. For example, the airfoil assembly 90 may generally define a variable stator vane (VSV) or variable guide vane (VGV) of the engine 10, such as coupled to one or more synchronization rings or brackets coupled to an actuator to at least partially rotate the airfoil assembly 90 about an axis defined through the shaft 110. As another example, the airfoil assembly 90 may more specifically define a variable vane within the compressor section 21, such as to alter a pressure or flow rate of air 80, 82 through stages of the compressor section 21 to maintain or improve operability or performance of the compressor section 21 and the engine 10. For example, the airfoil assembly 90 defining variable vanes within the compressor section 21 may rotate about an axis through the shaft 110 to mitigate compressor stall or surge.

Embodiments of the airfoil assembly 90 provided herein improve engine 10 performance via reducing weight relative to known airfoil assemblies. The reduced weight thereby improves a ratio of engine thrust output versus weight, further improving fuel consumption of the engine and an apparatus to which the engine is attached (e.g., an aircraft, a ground-based vehicle, a sea-based vehicle, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil assembly for a turbo machine, the airfoil assembly comprising:
    an airfoil defining a leading edge and a trailing edge, and further defining a pair of ends separated relative to a span of the airfoil;
    a shaft extended from at least one end of the airfoil; and
    a button surrounding at least a portion of the end of the airfoil, the button extending at least partially along the span of the airfoil, wherein the button comprises a polymer matrix composite (PMC) material.

2. The airfoil assembly of claim 1, wherein the button comprises the PMC material comprising one or more styrenes, vinyls, cellulosics, polyesters, acrylics, polysulphones, imides, or combinations thereof.

3. The airfoil assembly of claim 1, wherein the button comprises the PMC material comprising one or more polyolefins, polyamides, fluoropolymer, ethyl-methyl acrylate, polyesters, polycarbonates, acetals, or combinations thereof.

4. The airfoil assembly of claim 1, wherein the button comprises the PMC material comprising one or more polyesters, polyurethanes, esters, epoxies, or combinations thereof.

5. The airfoil assembly of claim 1, wherein the button is extended along a chord of the airfoil from the leading edge to the trailing edge.

6. The airfoil assembly of claim 1, wherein the button is defined along 10% or less of the span of the airfoil.

7. The airfoil assembly of claim 1, wherein the airfoil comprises a composite material.

8. The airfoil assembly of claim 1, wherein the shaft comprises a metal-based material.

9. The airfoil assembly of claim 1, wherein the shaft, button, and the airfoil are formed integrally together.

10. A turbo machine, the turbo machine comprising:
    an airfoil assembly comprising:
        an airfoil defining a leading edge and a trailing edge, and further defining a pair of ends separated relative to a span of the airfoil;
        a shaft extended from at least one end of the airfoil; and
        a button surrounding at least a portion of the end of the airfoil, the button extending at least partially along the span of the airfoil, wherein the button comprises a polymer matrix composite (PMC) material; and
    a casing defining a recess into which the button of the airfoil assembly is disposed.

11. The turbo machine of claim 10, wherein the airfoil assembly and the casing together define, at least in part, a compressor section of the turbo machine.

12. The turbo machine of claim 10, wherein the button of the airfoil assembly comprises the PMC material comprising one or more styrenes, vinyls, cellulosics, polyesters, acrylics, polysulphones, imides, or combinations thereof.

13. The turbo machine of claim 10, wherein the button of the airfoil assembly comprises the PMC material comprising one or more polyolefins, polyamides, fluoropolymer, ethyl-methyl acrylate, polyesters, polycarbonates, acetals, or combinations thereof.

14. The turbo machine of claim 10, wherein the button of the airfoil assembly comprises the PMC material comprising one or more polyesters, polyurethanes, esters, epoxies, or combinations thereof.

15. The turbo machine of claim 10, wherein the button of the airfoil assembly is extended along a chord of the airfoil from the leading edge to the trailing edge.

16. The turbo machine of claim 10, wherein the button of the airfoil assembly is defined along 10% or less of the span of the airfoil.

17. The turbo machine of claim 10, wherein the airfoil of the airfoil assembly comprises a composite material.

18. The turbo machine of claim 10, wherein the shaft of the airfoil assembly comprises a metal-based material.

* * * * *